United States Patent [19]
Davis et al.

[11] 3,833,236
[45] Sept. 3, 1974

[54] EQUALIZED SUSPENSION SYSTEM FOR A TANDEM AXLE VEHICLE

[75] Inventors: Robert W. Davis, Ozark; James C. Ward, Springfield, both of Mo.

[73] Assignee: A. J. Industries, Inc., Los Angeles, Calif.

[22] Filed: July 16, 1973

[21] Appl. No.: 379,738

[52] U.S. Cl............ 280/104.5 B, 267/46, 267/54 R
[51] Int. Cl............................................. B60g 5/04
[58] Field of Search............ 280/104.5 R, 104.5 A, 280/104.5 B; 267/38, 46, 52, 54 R

[56] References Cited
UNITED STATES PATENTS
2,225,016  12/1940  Mallet et al.................. 280/104.5 B
3,186,731  6/1965  Fossard........................ 280/104.5 R

*Primary Examiner*—Philip Goodman
*Assistant Examiner*—John A. Carroll
*Attorney, Agent, or Firm*—Jessup & Beecher

[57] ABSTRACT

An equalized suspension system is provided for the trailer of a trailer-truck combination of the tandem axle type, and which is mounted on each side of the trailer near the rear thereof. The suspension on each side of the trailer includes independent semielliptic leaf springs mounted in tandem relationship one behind the other, and which are respectively connected at their midpoints to the front and rear axles of the trailer. The remote ends of each spring are supported in respective brackets which, in turn, are secured to the frame of the trailer. Two equalizer support brackets are provided between the adjacent ends of each pair of springs, and two bell cranks are respectively supported in the equalizer support brackets. A tension bar intercouples the bell cranks. The adjacent ends of the springs are supported on bearing pads which are pivotally mounted in shackles. The shackles, in turn, are pivotally mounted to the respective bell cranks.

3 Claims, 3 Drawing Figures

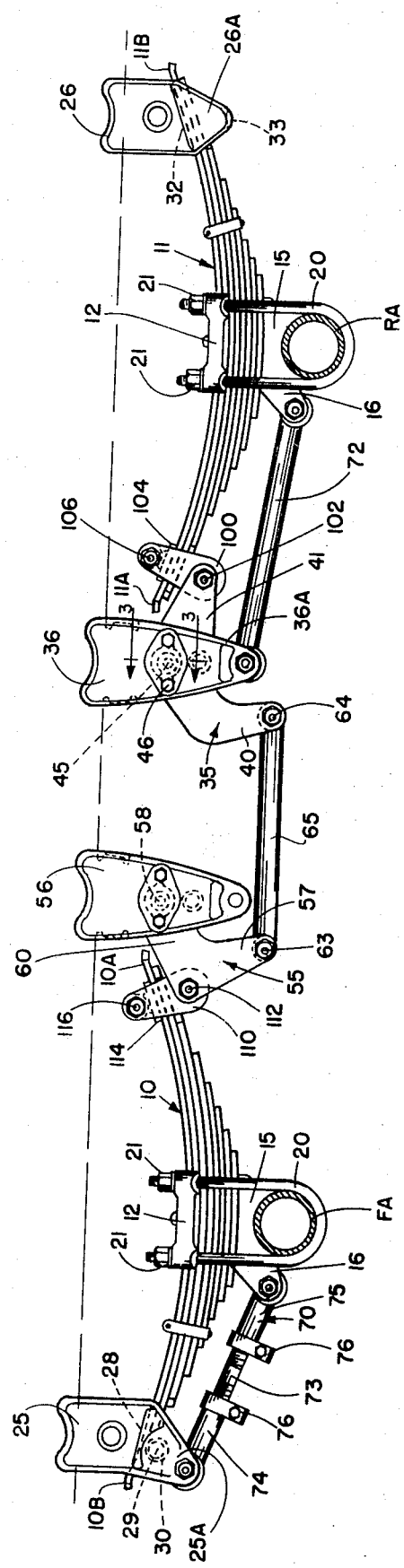

3,833,236

EQUALIZED SUSPENSION SYSTEM FOR A TANDEM AXLE VEHICLE

BACKGROUND OF THE INVENTION

The suspension of the present invention is of the general type described in U.S. Pat. No. 3,186,731 which was issued June 1, 1965, to the present assignee. As described in the patent, the trailer of a trailer-truck combination is frequently of the tandem axle type. That is, the end of the trailer remote from the fifth wheel is supported by wheels on axles arranged one behind the other in tandem relationship. The springs are disposed as front and rear springs on each side of the vehicle frame, and are connected at their midpoints to the related axles. The adjacent inner ends of each pair of springs is intercoupled in the prior art assemblies in accordance with an equalizer of one kind or another which serves to distribute the impressed loads between the springs. Thus, the consequence of the arrangement for the equalized suspension described above, is that if the front wheels in the tandem suspension, for example, should encounter a condition in the road producing a severe vertical movement of the front axle, the resultant deflection in the front springs will be transmitted by the equalizer in part to the rear springs. This results in an equalizing effect of the applied loads on the roadway for a tandem axle vehicle in which any abnormal vertical displacement of either axle, in the negative or positive sense, is distributed between the springs so as to minimize the weight differential between the axles. It can be appreciated, therefore, that the greater the equalizing capability of a tandem axle suspension, the lesser is the chance of damage to the roadway, pavement, or bridge structure due to concentrated loading of either axle.

In the instance of a vehicle equipped with a prior art equalization tandem of the type described above, and if the axles are in close proximity, the total load is concentrated on a relatively small portion of the roadway. However, if the axles are more widely spaced, the load is imposed on a comparatively larger portion of the roadway. It can be appreciated also, therefore, that the greater the vehicle axles are separated, proportionately, the lesser is the chance of damage to the roadway, pavement, or bridge structures, due to the load of the vehicle. This is recognized by the various States in the establishment of legal minimum spacings for tandem axles for a specified load, and further, in many States, by the allowance of increased legal axle loading for tandem-truck combinations having widely spaced axles.

In order to achieve the advantages of widely spaced axles in a tandem trailer-truck combination, it has been common practice in the industry to produce a tandem with an elongated equalizer, or rocking beam of a length comparable with the separation of the trailer axles. This beam is, of necessity, a heavy complex member. Furthermore, desired variations in axle spacing require the production of a specific beam for a particular axle spacing. The vehicle suspension described in the patent is of a type which will afford a lighter weight in construction, as compared with the previous rocking beam type of equalizer, and which will permit any particular unit to be fitted into a variety of trailers with different axial separations. Further, the particular suspension system described in the patent makes it possible easily to accommodate changes in the axle spacing of the trailer, as the service of the trailer dictates.

In the suspension system described in the patent, the leaf springs of each pair on each side of the trailer are supported in appropriate brackets. That is, four brackets are mounted along each side of the trailer, and the ends of the forward leaf spring and rear leaf spring of each pair are respectively supported in the brackets. The two inner brackets are intercoupled through an equalizer mechanism, as described in the patent. Appropriate integral bearing pads are provided on the outer brackets, and on the suspended equalizer arms of the inner brackets, for receiving the ends of the respective leaf springs.

The suspension system of the patent has been found to operate with a high degree of satisfaction. However, one problem that has been encountered, and is common to tandem axle suspensions with similar equalizing mechanisms, is that of inadequate load equalization from one axle to the other. This condition occurs as a result of greatly unequal moments about the center pivot points of the equalizing mechanisms. More specifically this is due to the attitude of the integral equalizer bearing pads relative to the spring ends as equalizer rotation occurs. As one end of the equalizer rotates upwardly the point at which the spring end contacts the integral bearing pad moves in the inboard direction. Concurrently the opposite end of the equalizer moves downwardly and the point at which its respective spring end contacts its integral bearing pad moves in the outboard direction. This action causes the greatly unequal moments about the center pivot point which, in effect, puts the axle which encounters a bump at a mechanical disadvantage as it tries to rotate the equalizing mechanism and evenly distribute its load with the other axle.

The system of the present invention includes pivotal bearing pads and shackles interposed between the inner ends of the leaf springs and of the equalizer arms which support the inner ends of the leaf springs. As equalizer rotation occurs, although the spring ends, bearing pads, and shackles change in attitude relative to the equalizer beams, the points at which they transmit their load to the equalizer beams remain substantially equal inasmuch as they are defined by the arcular path on which they travel about the center pivot of the equalizer mechanism during equalizer rotation. Thusly, the moments about the center pivot points of the equalizer mechanism remain much more nearly equal resulting in more even distribution of load from one axle to the other. Further, the pivotally mounted bearing pads and shackles permit a wide deflection of each of the leaf springs with a minimum of relative movement between the ends of the springs and the bearing pads, so that wear is minimized. The foregoing obtains even in the case of relatively widely spaced axles and relatively high loads.

BRIEF DESCRIPTION OF THE DRAWINGS

FIG. 2 is a partly broken-away side elevation of a suspension assembly constructed in accordance with one embodiment of the invention.

DETAILED DESCRIPTION OF THE ILLUSTRATED EMBODIMENT

Figure 1:
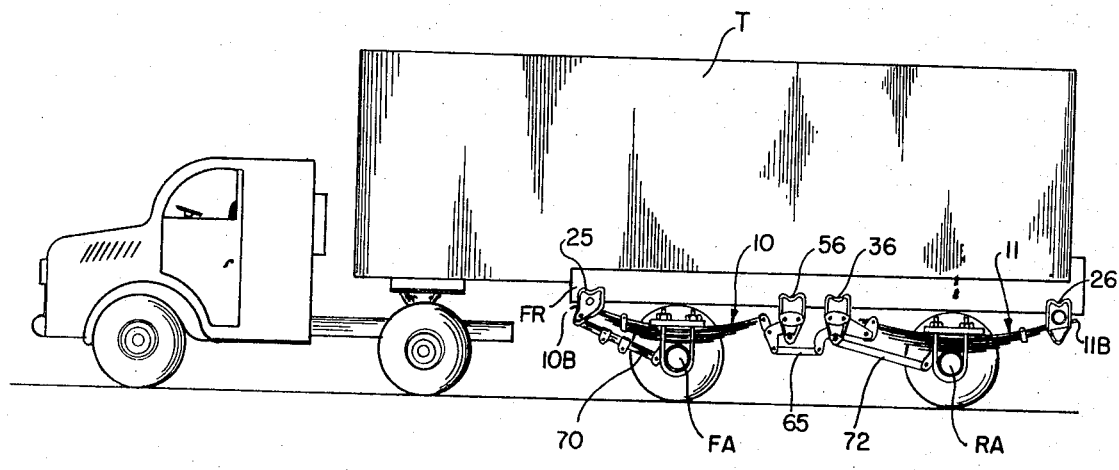
FIG. 1 is a somewhat schematic view of a trailer-truck combination having a tandem axle trailer equalized with a suspension incorporating the concepts of the present invention.
Figure 3:
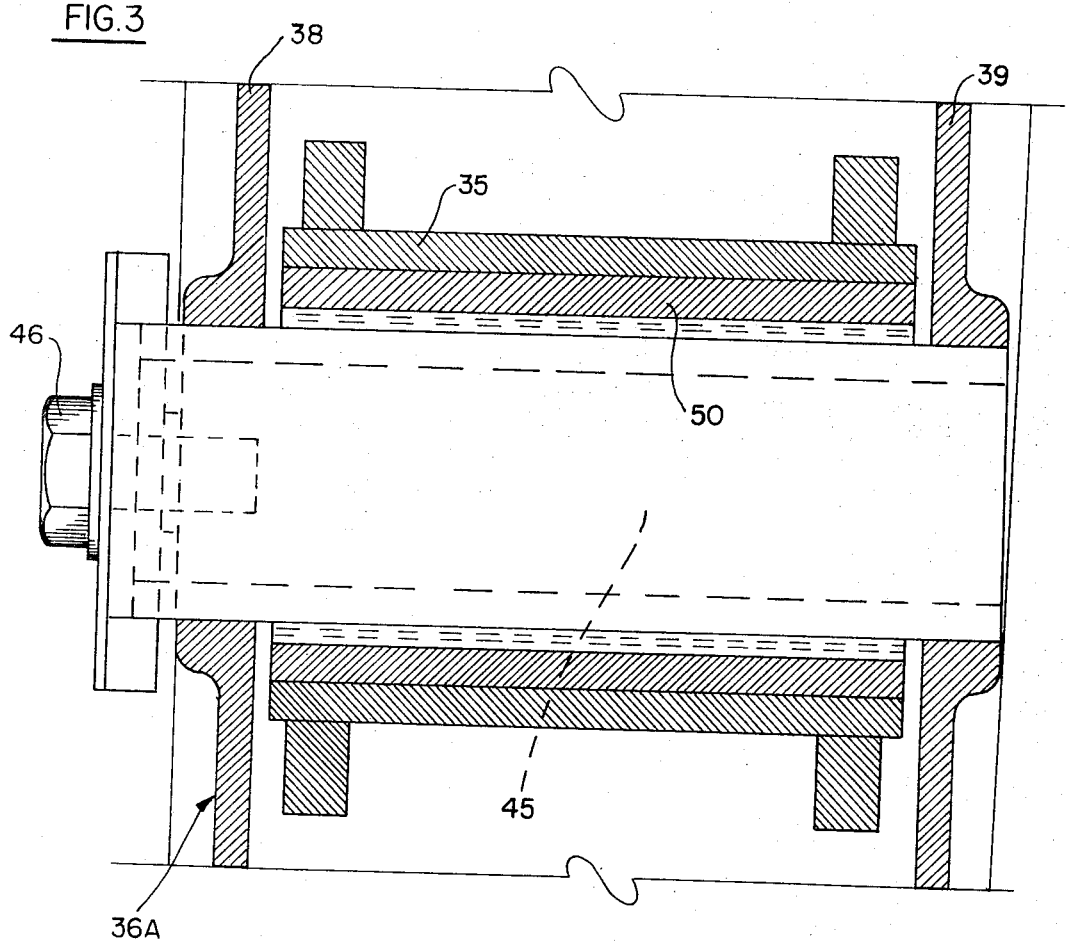
FIG. 3 is an enlarged sectional view taken substantially on the line 3—3 of FIG. 2.

In FIG. 1 there is illustrated a tandem axle vehicle in the form of a trailer T having front and rear axles FA and RA supporting the related wheels, the axles being of the so-called dead or undriven type. In order to preserve the cargo, and to prevent damage to the trailer and roadway, the axles FA and RA are associated with an improved suspension of the semi-elliptic leaf spring type, the details of which are illustrated in FIGS. 2 and 3.

It should be noted that the representation of FIG. 2 is the suspension system on one side of the trailer, and that a similar suspension system is also mounted on the other side of the trailer. As mentioned above, the suspension system, as shown in FIG. 2 includes springs of the elongated type, and specifically a semi-elliptic forward compound leaf spring 10, and a semi-elliptic rear compound leaf spring 11. As shown in FIGS. 1 and 2, the leaf springs 10 and 11 are independent of one another, and are arranged in a tandem relationship one behind the other, so that the springs have inner ends 10a and 11a disposed adjacent to one another, and outer ends 10b and 11b remote from one another.

The semi-elliptic compound leaf springs 10 and 11 are connected at substantially their midpoints respectively to the front and rear axles FA and RA of the trailer. The connections are identical for both the front and rear springs, and include a top plate 12 configured to embrace the back or concave mid-section of the corresponding spring stack. The bottom of the spring stack in each instance rests on an axle seat 15 having an upper face complemental to the arc of the lowermost leaf spring with the lower face thereof shaped complemental to the curve of the axle FA or RA to embrace the same.

An arm 16 extends forwardly from and depends below each axle seat 15. Each arm 16 is cast integral with the related axle seat 15, and the latter are rigidly secured as by welding to the related axles to be unitary therewith.

It will be seen that each of the semi-elliptic compound leaf springs 10 and 11 is embraced at the midpoint thereof by the top plates 12 and axle seats 15. These enable the springs to be firmly joined independently to each related axle. To this end, U-Bolts 20 are disposed with the bight portions thereof at the underside of the axles FA and RA, and with the legs thereof projected through receiving sockets provided therefor in the top plates 12. The threaded ends of the U-Bolts 20 project upwardly beyond the top plates 12, and self-locking nuts 21 are threaded tightly thereon to the extent that each spring is rigidly joined to the related axle so that any movement of the axle is accompanied by movement of the spring.

The front end 10b of each front spring 10 is arranged to react against the frame of the trailer in the event the spring is flexed by an upwardly applied force encountered by the axle FA, and the rear end of each rear spring 11 is arranged to react against the frame of the vehicle in the event the spring is flexed by an upwardly applied force encountered by the axle RA. However, the rear end of each front spring and front end of each rear spring are mutually equalized to enable loads to be distributed back and forth between the springs in a manner to be described.

A front axle bracket 25 and a rear axle bracket 26 are secured to the frame FR at locations corresponding to the remote ends 10b and 11b of the springs 10 and 11. The brackets 25 and 26 include downwardly extending leg portions 25a and 26a, respectively. The front bracket 25 is provided on the inside face thereof below the frame FR with a substantially horizontal support bearing pad 28, having a lower surface engaged by the end 10b of the front spring 10. Advantageously, a horizontally disposed pipe brace 30 is secured to the inside face of the bracket 25 and extends transversely beneath the frame FR to have an opposite end joined in like fashion to an identical bracket in the system on the far side of the trailer.

The leg 25a of the bracket 25 is in reality a hollow housing, and the front end 10b of the front spring extends into this housing to engage the bearing pad 28. The bearing pad 28 enables the front spring 10 to effectively bear against the frame FR when supporting the load of the vehicle. A retaining bar 29 is arranged within the depending housing 25a of the bracket 25 beneath the front end of the front spring to prevent the spring from being dislocated from the bracket.

The rear end 11b of the rear spring 11 is supported in a similar manner in the bracket 26. Specifically, the rear end 11b of the spring 11 bears against the underside of a bearing pad 32 in the bracket housing 26a. Dislocation of the spring 11 relative to the housing of the bracket 26 is prevented by a retaining bar extending across the bracket housing directly beneath the inner end 11b of the spring 11.

As noted above, the inner or adjacent ends 10a and 11a of the springs 10 and 11 are equalized and, for that purpose, the suspension includes at each side of the vehicle, two equalizer support brackets 36 and 56, and two pivotally mounted equalizer arms, in the form of bell cranks 35 and 55, which may be relatively widely spaced along the side of the trailer from one another without adversely affecting the operation of the equalizer assembly.

The front end 11a of the rear spring 11 is associated with the equalizer crank 35 which, in turn, is pivotally supported by the bracket 36 secured to the frame FR. The bracket 36 is rigidly secured as by welding to the frame FR, as are the brackets 25, 26 and 56. The bracket 36 is accurately located with regard to the length of the spring which is supported by the bracket, as will be described. The housing portion 36a of bracket 36, as shown in detail in FIG. 3, has spaced sides 38 and 39. The crank arm 35 is accommodated between the sides 38 and 39 for pivotal movement within the bracket. The equalizer crank 35 has left and right hand arm portions 40 and 41, as shown, which extend on opposite sides of the bracket.

The aperture in the crank 35 is of relatively large size and is arranged to be disposed concentrically about a horisontal support shaft 45, as shown in FIG. 3, which has its ends disposed within openings formed in the opposite side walls 38 and 39 of the bracket 36 which define the depending portion 36a of the bracket. The support shaft 45 is secured within the bracket against rotation by screws 46. The crank 35 is supported pivotally by the shaft 45, and a bearing member including a bushing 50 is interposed between the crank arm and the shaft. The bushing permits rocking action of the crank arm about the shaft. It will be understood that the bracket 56 contains a similar assembly.

The arms 40 and 41 of the crank 35 project from the forward and rear sides of the pivotal support shaft 45. The forward end 11a of the spring 11 is supported in a shackle 100, which in turn, is pivotally supported on the end of the arm 41 by a shaft and bushing assembly 102 similar to that described in conjunction with the bracket 36. The end 11a of the spring 11 extends into the shackle in contact with a pivotally mounted bearing pad 104. The end 11a of the spring is held in the shackle by means of the bearing pad and of the shaft and bushing assembly 102. The bearing pad is pivotally mounted in the shackle by means of a shaft and bushing assembly 106.

The rear end 10a of the front spring 10 is supported in a similar shackle 110 which is pivotally mounted to the crank 55 by means, for example, of a bolt and bushing assembly 112. The shackle 110 includes a bearing pad 114 for the end 10a of the spring 10, the bearing pad 114 being pivotally mounted in the shackle by means of a bolt and bushing assembly 116. The equalizer crank 55 includes two separate arm portions 57 and 60, but these, unlike the arm portions 40 and 41 of the crank 35 described above, project from the same side of the pivot support 58 of the crank arm 60 within the bracket 56.

Thus, as shown in FIG. 2, the equalizer crank 55 includes a lower arm portion 57 extending downwardly at a predetermined angle from a horizontal support shaft 58 carried by the bracket 56 and which serves pivotally to support the crank 55. The crank 55 includes the upper arm portion 60 projecting forwardly of the pivot point 58 at a different angle. The shackle 110 is pivotally coupled to the apex of the arms 57 and 60 at the pivot point 112. The equalizer assembly is completed by a horizontal tension bar or link 65. The link 65 is connected at one end pivotally to the lower arm 57 of the crank 55, and it is connected at its opposite end pivotally to the lower arm 40 of the crank 35. It will be recognized that oscillation of one equalizer crank 55 or 35 will be transmitted to the other through the link 65.

As shown in FIG. 2, the depending leg 25a of the front bracket 25 extends well below the transverse bracing tube 30, and a front torque rod 70 is connected at the front end thereto and extends rearwardly to be connected to the lower end of the arm 16 which is associated with the axle seat 15. The torque rod 70 is illustrated in FIG. 2 as adjustable in nature, whereas the corresponding torque rod that would be on the opposite side of the frame FR is a one-piece construction similar to the torque rod 72 of FIG. 2.

The torque rod 70 includes at the mid-section thereof an adjusting tube 73 having threaded ends of opposite hand respectively associated with correspondingly threaded ends of tube sections 74 and 75. The threaded ends of the tube sections 74 and 75 are split, and clamps 76 are associated therewith so as to rigidly clamp the three sections together after proper adjustments have been completed. Therefore, by loosening the clamps 76 and turning the intermediate adjusting member 73, the effective length of the torque rod 70 can be changed, primarily for the purpose of aligning the axles FA and RA to be parallel to one another.

The torque rod 72 extends between the lower end of the bracket 36 and the arm 16 associated with the rear axle seat 15. The torque rod 72 is a one-piece construction, but the torque rod corresponding thereto on the opposite side of the frame will have the adjustment feature described above in connection with the torque rod 70 and this, as noted, is for the purpose of aligning the axles FA and RA.

When a load is impressed on one of the axles, for example on the front axle FA, as a result of an unexpected road condition being encountered, and which results in a sudden upward impact transmitted to the axle FA, the spring 10 as a result tends to be lifted and, under such circumstances will tend to be straightened out somewhat inasmuch as the front end 10b thereof in effect reacts on the frame of the vehicle. However, the rear end 10a of the spring is also moved upwardly, and as a result clockwise movement is imparted to the equalizer crank 55, and the arm 57 thereof exerts a tension on the link 65 tending to pull the link 65 forward. At the same time, the rear equalizer crank 35 tends to be rocked or pivoted clockwise by the link 65 undergoing the forward movement. This produces a downward thrust on the front end of the rear spring 11a through the equalizer arm 40. In this manner, a part of the front axle loading that produced deflection of the front spring 10 is transmitted through the equalizer crank 55, through the link 65, and through the equalizer crank 35, to the front end of the rear spring.

When the unexpected load exerted on the front axle resulting in load equalization described above is removed, the rear spring tends to restore itself to its normal or free-running condition, manifested in an upward rebound. Counterclockwise movement is then produced in the equalizer crank 35 by the upwardly moving front end 11a of the rear spring 11 exerting a thrust on the arm 40. This produces rearward movement of the link 65, resulting directly in a counterclockwise movement of the front equalizer crank 55, causing the latter to be restored to its free running condition.

It will be appreciated that the play of forces described above will produce periodic oscillation gradually dampened out to the extent that the equalizers eventually assume their normal running characteristic of smooth road conditions.

By including the pivotal shackles 100 and 110 and pivotal bearing pads 104 and 114 in the suspension system, as shown in FIG. 2, the relative movement between the springs 10 and 11, and the respective bearing pads 104 and 114 is minimized so that wear likewise is minimized, this being due to the fact that the inclusion of the shackles and bearing pads imparts a conforming relationship between the respective equalizer cranks 35 and 55 and the corresponding ends 11a and 10a of the springs.

Moreover, the pivotally mounted shackles and bearing pads have a tendency to maintain variations in the moments between the pivot points 45 and 58, on one hand, and the ends 11a and 10a of the springs, on the other hand, at a minimum, allowing a load imposed on one axle to be more equally distributed with the other axle. Moreover, the inclusion of the pivotally mounted shackles and bearing pads in the suspension assembly provides a smoother coupling between the crank arms and the ends of the springs for a better distribution of forces, and for a smoother action of the system.

It will be appreciated, of course, that although a particular embodiment of the invention has been shown and described, modifications may be made. It is in-

What is claimed is:

1. In a suspension system for a vehicle having front and rear tandem axles, first and second elongated semi-elliptic compound leaf springs mounted in tandem one behind the other on each side of the vehicle and independent of one another, means coupling the medial portion of each of said springs to the axles so that the springs at each side of the vehicle have inner ends disposed adjacent to one another and outer ends spaced remotely from one another; means supporting the outer ends of the respective springs on the frame of the vehicle to react against the frame of the vehicle in the event a corresponding spring is flexed upwardly by an upwardly applied force encountered by the corresponding axle; a first equalizer bracket secured to the frame of the vehicle adjacent the inner end of said first spring, a first equalizer crank pivotally mounted on said first equalizer bracket; a first shackle assembly pivotally mounted on said first equalizer crank and engaged in sliding contact with the inner end of said first spring so as to rock said first equalizer crank upon a vertical force being impressed on the corresponding axle, a second equalizer bracket secured to the frame of the vehicle adjacent the inner end of said second spring; a second equalizer crank pivotally mounted on said second equalizer bracket; a second shackle assembly pivotally mounted on said second equalizer crank and engaged in sliding contact with the inner end of said second spring so as to rock said second equalizer crank upon a vertical force being exerted on the corresponding axle and spring; a link interconnecting said first and second equalizer cranks, said first and second equalizer cranks being pivotally mounted within said first and second equalizer brackets intermediate the inner ends of said springs, and said equalizer cranks each having an arm portion depending below the respective coupling points with said first and second shackle assemblies, and each of said cranks having a point of direct pivotal connection to said link, so that an encountered force exerted on one axle deflecting the associate spring and causing one of the equalizer cranks to turn in one direction is transmitted directly through the link to the other equalizer crank causing the other equalizer crank to turn in the opposite direction, which imposes part of the encountered force on the inner end of the other spring associated therewith.

2. The suspension system defined in claim 1, wherein the first and second equalizer brackets are disposed beneath the frame of the vehicle, and wherein the equalizer cranks are supported thereby below the frame of the vehicle.

3. The suspension system defined in claim 1, and which includes bearing pads mounted in each of said shackle assemblies in sliding contact with the end of the corresponding spring, said shackles serving to minimize the relative amount of wear between said bearing pads and the ends of said springs.

* * * * *